June 13, 1961  B. N. ASHTON ET AL  2,988,004
POWER PACK UNIT

Filed Feb. 14, 1957  4 Sheets-Sheet 1

INVENTORS
BENJAMIN N. ASHTON
EMERSON RAWDING
HENRY VON PESSLER
BY
THEIR ATTORNEYS

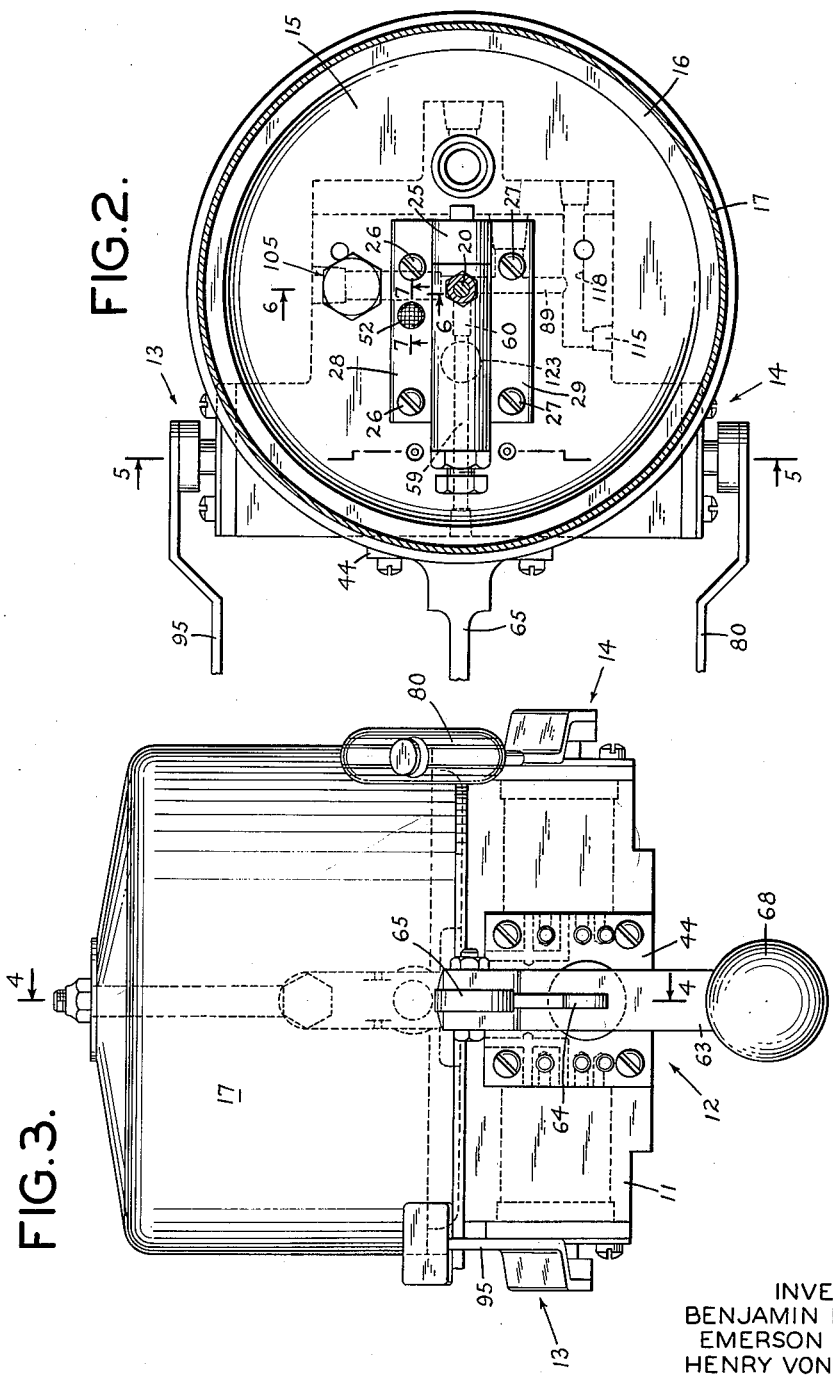

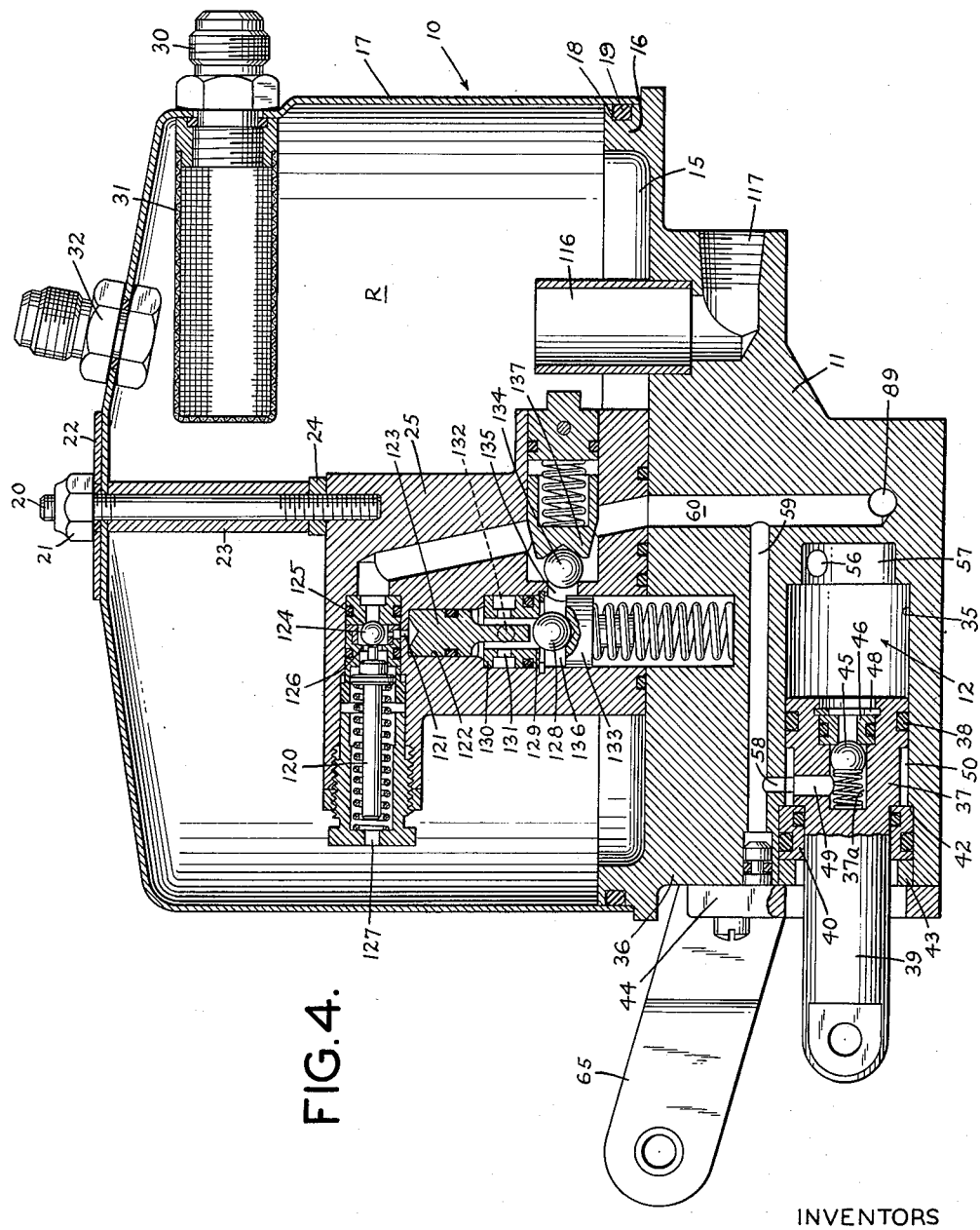

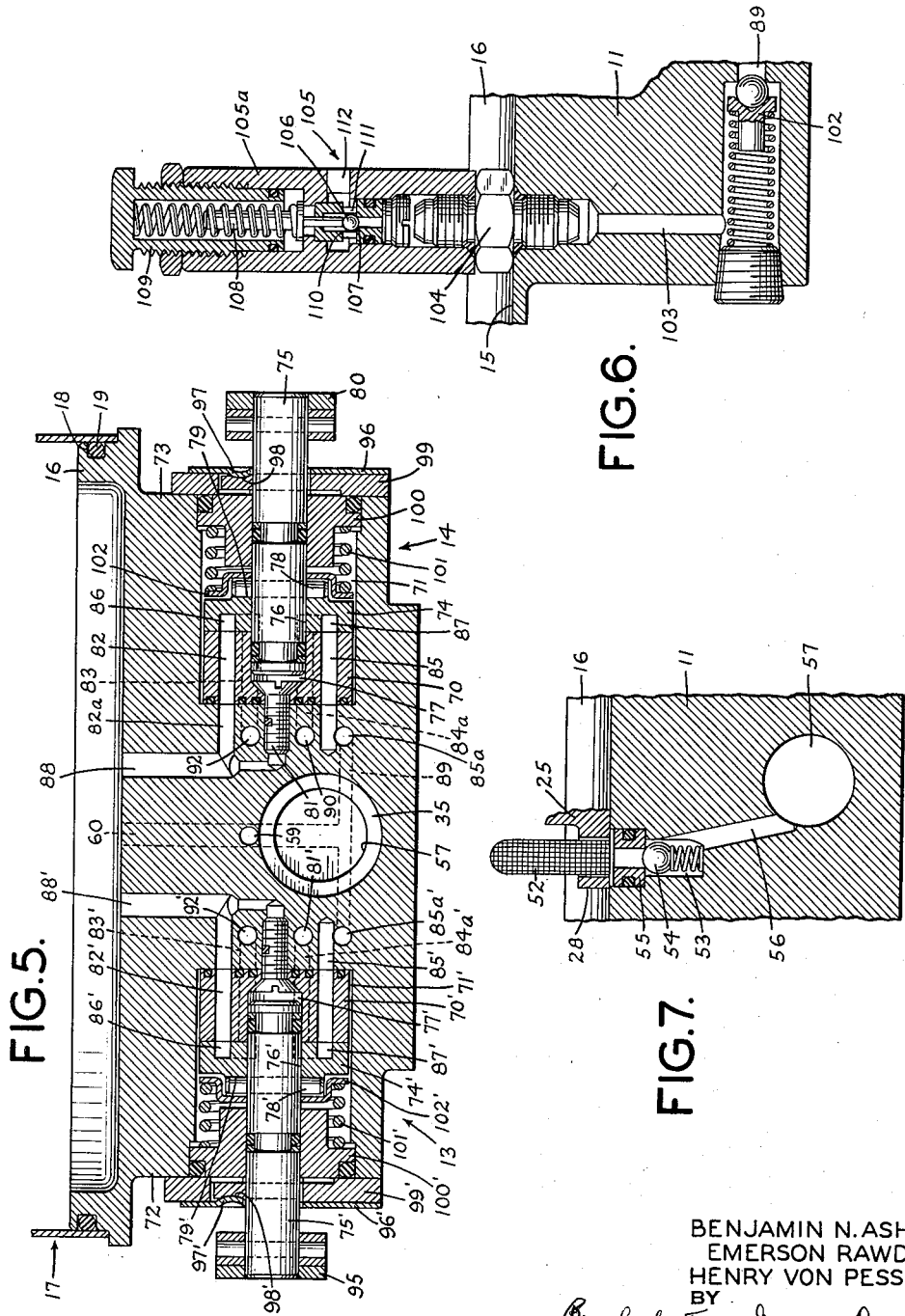

United States Patent Office 2,988,004
Patented June 13, 1961

2,988,004
POWER PACK UNIT
Benjamin N. Ashton and Emerson Rawding, Kingston, and Henry Von Pessler, Cottekill, N.Y., assignors, by mesne assignments, to Electrol Incorporated, a corporation of New York
Filed Feb. 14, 1957, Ser. No. 640,123
3 Claims. (Cl. 103—41)

This invention relates to hydraulic power supply units, and it relates more particularly to a hydraulic power pack unit including a source of hydraulic pressure and control valves for actuating the hydraulic motors or cylinders of aircraft landing gear, wing flaps and the like.

In accordance with the present invention, we have provided a power pack unit which includes all of the elements necessary to supply hydraulic fluid under pressure to a plurality of hydraulic motors, jacks, cylinders, or the like, including control or selector valves by means of which the individual hydraulic motors can be actuated and controlled.

More particularly, the power pack unit includes a reservoir for hydraulic fluid, a manually-operated pump for withdrawing hydraulic fluid from the reservoir and supplying it to one or more selector valves to control the operation of one or more hydraulic motors or the like, the unit also being provided with pressure and thermal-relief valves by means of which pressure in the system can be regulated and controlled. In addition, the power pack unit may be used with a motor-driven pump and includes all of the elements necessary for maintenance of proper operation of the hydraulic system, for the maintenance of proper operating pressures in the system and for preventing damage to the system by development of excessive pressures therein.

For a better understanding of the present invention, reference may be had to the accompanying drawings in which:

FIGURE 2 is a view in section taken on line 2—2 of FIGURE 1;

FIGURE 3 is an end elevational view of the power pack unit;

FIGURE 4 is a view in section taken on line 4—4 of FIGURE 3 with the operating handle of the pump and a valve control handle removed;

FIGURE 5 is a view in section taken on line 5—5 of FIGURE 2;

FIGURE 6 is a view in section taken on line 6—6 of FIGURE 2; and

FIGURE 7 is a view in section taken on line 7—7 of FIGURE 2.

Figure 1:
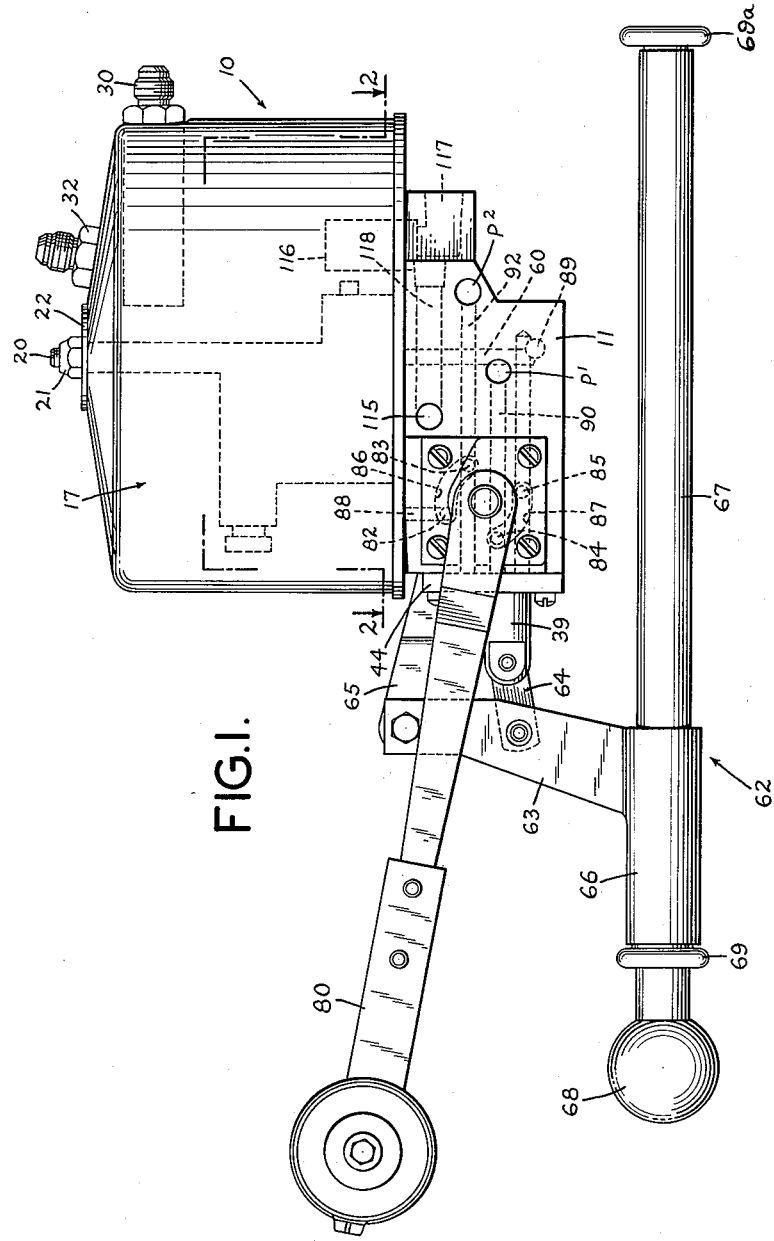
FIGURE 1 is a side elevational view of a typical power pack unit embodying the present invention.

The power pack unit illustrated herein is suitable for use in aircraft for actuating the retractable landing gear and wing flaps of the airplane, although it is not limited to such use. The unit 10 includes a base block 11 which forms a casing for a pump 12 (FIG. 4) and a pair of selector valves 13 and 14 (FIG. 5) together with the necessary connecting passages to be described later herein. A generally disc-like top 15 provided with an upstanding annular flange 16 around its edge is formed on the block 11 for cooperation with an inverted cup-shaped cover 17 to form a reservoir R for the reception of hydraulic fluid. A groove 18 is formed in the flange 16 for receiving a sealing ring 19 to prevent leakage between the edge of the cover 17 and the flange 16. The cover 17 is secured to the block 11 and in sealed engagement with the flange 16 by means of a threaded stud 20 having a clamping nut 21 thereon which engages a washer 22 on top of the cover 17, the stud passing through a spacing sleeve 23 and washer 24 and being threaded into a valve block 25 mounted on the top surface 15 of the base block 11. As shown in FIGURE 2, the block 25 is secured in position by means of screws 26 and 27 which pass through the flanges 28 and 29 on the block and are threaded into the base block 11.

As shown in FIGURE 4, a nipple or coupling 30 having a filter screen 31 at its inner end extends through the cover 17 and enables hydraulic fluid to be introduced into the reservoir. Another coupling 32 is also provided in the top of the cover to receive an air check valve through which air is introduced under pressure into the reservoir.

As indicated above, the base block or casing 11 contains a pump 12 including a cylinder or bore 35 extending in from one end 36 of the block 11. A piston 37 is slidable in the cylinder 35 and is provided with a sealing or piston ring 38 at its inner end. A piston rod 39 fixed to the piston passes through a sleeve 40 mounted adjacent to the outer end of the bore or cylinder 35, the sleeve being retained in fixed position against a shoulder 42 in the bore by means of a retaining ring 43 which is clamped in position by means of a plate 44 secured by screws or in any other suitable way to the end 36 of the block. Suitable seals are carried by the ring 40 to prevent leakage from the cylinder 35.

A check valve is mounted within a bore 37a in the piston 37, the valve including a spring-biased ball 45 which is disposed inwardly of and cooperates with an annular valve seat 46 which is retained in the bore 37a in the piston by means of a snap ring 48. The inner end of the bore 37a communicates with a radial passage 49 which in turn communicates with an annular space 50 between the piston and the wall of the cylinder or bore 35.

Referring now to FIGURES 2, 4 and 7, it will be seen that liquid can flow from the reservoir R through a filter member 52 which is mounted on the flange 28 of the valve block 25 into a chamber 53 formed in the block 11 and containing a check valve including a spring-biased ball 54 and a cooperating annular valve seat 55. The check valve ball 54 permits flow of fluid from the reservoir R through the passage 56 into the smaller diameter portion 57 of the cylinder 35, but prevents reverse flow therefrom. Inasmuch as the ball 45 of the check valve in the piston is displaced by fluid pressure when the piston is moved to the right in the cylinder, it will be apparent that reciprocation of the piston will cause fluid to be drawn alternately into the cylinder 35 then forced out through the valve seat 46 and the passage 49 in the piston into the space 50 around the piston and into the angularly related passages 58, 59 and 60 in the casing block 11.

As shown in FIGURES 1 and 3, the pump 12 is actuated by means of a collapsible hand pump lever 62 which includes a lever member 63 connected by means of a link 64 to the end of the piston rod 39. One end of the member 63 is pivotally connected to an arm 65 fixed to and extending outwardly from the plate 44. A tubular member 66 is mounted on the lower end of the member 63 and slidably receives a rod-like pump handle 67 having a knob 68 on one end and enlargements 69 and 69a thereon to keep the handle 67 from being detached from the sleeve 66, but enabling it to be moved from the retracted position shown in FIGURE 1 to an extended position.

The pump supplies liquid from the reservoir to the selector valves 13 and 14 which are essentially mirror images of each other and are mounted in opposite sides of the base block 11 as best shown in FIGURES 2, 3 and 5. Valve 14 will be described herein. Corresponding elements of the valve 13 will be identified by primed reference characters. The selector valve 14 includes a disc-like member 70 which is mounted in fixed position in the inner end of a bore 71 extending inwardly from a side 73 of the casing block 11. Cooperating with the fixed disc member 70 is a relatively rotatable disc member 74 which is mounted on an operating shaft 75 that extends through the opening 76 in the disc 74 and into the recess 77 of the disc 70. A cross pin 78 engages in a slot or notch 79 in the outer surface of the disc 74 to enable the disc to be rotated by the shaft 75. An operating lever 80 is fixed to the end of the shaft 75 for rotating it between a raised position shown in FIGURE 3 and a depressed position. A self-locking screw 81 in the bottom of the recess 77 may be used to hold the disc member 70 against rotation.

As shown in FIGURES 1 and 5, the fixed disc member 70 is provided with four angularly spaced-apart passages 82, 83, 84 and 85 which cooperate with two arcuate grooves 86 and 87 in the disc member 74. Thus, the arcuate groove 86 serves to connect the passages 82 and 83 in the raised position of the lever 80, while the groove 87 connects the passages 84, 85. In the lowered position of the lever 80, the groove 86 connects the passages 82 and 84 and the groove 87 connects the passages 83 and 85. As indicated in FIGURE 5 the passage 82 is connected to a passage 82a in the block 11 and communicates with a vertical passage 88 which serves as a return line to the reservoir, while the passage 85 is connected with a passage 85a and a passage 89 in the casing which is connected with the pressure side of the pump 12 by means of the passages 58, 59 and 60 (FIG. 4). It will be apparent, therefore, that when the valve 14 is in the condition such that the lever 80 is raised, actuation of the hand pump 12 will discharge the liquid through the passages 58, 59, 60, 85a and 85, the groove 87 in the rotary valve member 74 to the passages 84, 84a and the passage 90 which is connected to the cylinder port P¹ in the side of the casing block 11. Assuming that the port P¹ is connected with a hydraulic jack, the liquid pressure at the port P¹ will cause actuation of the jack. Liquid from the return port of the jack will flow into the cylinder port P² in the casing block as shown in FIGURE 1, through the passage 92 into the passage 83, the groove 86 in the rotary valve element 74, out of the passages 82, 82a and 88 into the reservoir of the power unit.

When the lever 80 is moved to the lower position and the hand pump is actuated, liquid under pressure will be delivered through the passages 58, 59, 60 and 89 to the passage 85 and through the groove 87 to the passages 83, 92 and the cylinder port P² thereby driving the jack in the opposite direction. Fluid from the opposite end of the jack will pass through the cylinder port P¹, the passages 90, 84a, 84, through the valve groove 86 to the passage 82 and through the passage 88 (FIGURE 5) to the reservoir R.

The valve 13 operates in the same way as the valve 14 so that it can supply liquid under the control of the operating handle 95 thereon to another set of jacks or hydraulic motors.

In order to retain the valves in either of the two positions indicated or in a neutral position in which all of the passages 82, 83, 84 and 85 are out of communication with each other, the shaft 75 may be provided with a springy disc 96 having a protuberance 97 thereon for engagement in appropriately positioned recesses 98 in a plate 99 fixed to the end of the valve casing in a position overlying the disc-like sealing and retaining member 100 which is positioned in the outer end of the bore 71.

The valve also includes a spring member 101 which is used to press the rotary valve member 74 against the fixed disc member 70 to preclude leakage therebetween. A retaining ring 102 is engaged by the inner end of the spring 101 and bears against the rotary valve member 74.

Inasmuch as the system is subjected to varying temperatures, the liquid in the system will expand and contract. In order to enable relief of thermally produced pressures in the system, the power pack may be provided with a check valve 102 (FIG. 6) at one end of the passage 89 which is displaceable by expansion of the fluid to allow it to escape through a vertical passage 103 in the casing 11, a coupling 104, to an unloading valve 105 of the type disclosed in the Ashton U.S. Patent No. 2,474,772 dated June 28, 1949. The unloading valve 105 is of a type including a ball valve 106 which is normally biased into engagement with an annular valve seat 107 by means of a spring biased plunger 108, the pressure of which can be adjusted by means of an adjusting cap nut 109, threaded into the upper end of valve casing 105a. When the pressure in the system becomes great enough to displace the ball valve 106 from the seat 107, the valve will be lifted against a larger seat 110 and the hydraulic fluid escapes through a port 111 and a passage 112 in the valve casing into the reservoir R until the pressure in the system drops sufficiently to enable the ball to be forced down against the seat 107 by means of the plunger 108.

While the power pack thus far described is a complete apparatus for supplying and controlling the flow of hydraulic fluid under pressure, the apparatus may also be used with a motor-driven pump if desired. To that end, the casing block 11 is provided with a pressure port 115 (FIG. 1) to be connected with the pressure side of an engine driven pump and a stand pipe 116 and withdrawal port 117 to be connected to the intake side of the pump or the low pressure side of the hydraulic system. It will be understood that when a motor-driven pump is not used, the ports 115 and 117 will be plugged.

Referring to FIGURES 1 and 4, it will be seen that the pressure port 115 is connected by means of a passage 118 to the passage 60 so that the pumps can supply liquid under pressure to the passages 85 and 85' of each of the valves 13 and 14 to enable these valves to control the operation of two different sets of hydraulic motors or jacks.

Inasmuch as there is a greater probability of a motor-driven pump overloading the system, the power pack unit is provided with an auxiliary unloading and pressure regulating valve assembly which is mounted in the valve block 25. Referring to FIGURE 4, it will be seen that the upper end of the passage 60 communicates with the inlet end of an unloading valve 120 similar to the unloading valve 105 described above. The unloading valve 120 differs from the valve 105 in that the discharge port 121 thereof communicates with a cylinder 122 in the valve block 25 which has piston 123 slidable therein. The piston 123 is displaced downwardly by fluid pressure when the ball valve 124 of the unloading valve 120 is displaced from the seat 125 into engagement with the seat 126 by excess fluid pressure. Fluid can escape from the cylinder 123 through the valve seat 126 and the port 127 in the outer end of the unloading valve when the ball 124 engages the seat 125.

Downward movement of the piston 123 displaces another ball valve member 128 from a cooperating seat 129 formed by an annular ring 130 provided with passages 131 extending radially therethrough. A relief port 132 in the valve block 25 communicates with the radial ports 128 to allow fluid to flow therethrough into the reservoir R.

A spring biased plunger 133 normally urges the ball valve 128 toward the seat 129 and opposes its displacement by the piston 123.

A pressure responsive ball valve member 134 normally closes a port 135 between the passage 60 and the chamber 136 in which the ball valve member 128 is located. A spring-biased piston 137 normally urges the ball 134 in a direction to close the passage but is displaceable by excessive fluid pressure to permit flow of fluid from the passage 60 through the port 135, the valve seat 129, the ports 131 and the return port 132 into the reservoir when the pressure conditions are such that all of the ball valves 126, 128 and 134 are displaced from their seats. The above-described structure serves as an effective pressure regulator for the system thereby maintaining a proper operating pressure in the system, while precluding damage to the parts thereof by the development of excessive pressures in the system.

When the system pressure drops, the ball valve 126 engages its seat 127 and the ball valves 128 and 134 also are seated. Escape of liquid from the cylinder 122 through the ports 121, open seat 126 and the port 127 enables the valve 128 to be forced against its seat 129 by the plunger 133.

From the foregoing it will be apparent that a power pack unit has been provided which is manually controlled and operated and can be supplied with hydraulic pressure from an exterior source by means of a pump, if required. The power pack unit is effective to enable actuation of wing flaps and landing gear either by manual operation of the hand pump or by an engine-driven pump or by the manual pump if the engine-driven pump is disabled.

It will be understood further that the device may be made in appropriate sizes and with an appropriate number of valves therein depending upon the service requirements of the apparatus. Accordingly, the form of the invention described herein should be considered as illustrative and not as limiting the scope of the following claims.

We claim:

1. A power pack unit comprising a casing block having bores extending inwardly from opposite sides thereof, rotary selector valves mounted in said bores and having actuating shafts substantially co-axial with said bores, a pump cylinder bore in said casing substantially perpendicular to said shafts, a piston reciprocable in said cylinder bore, a pump handle pivotally mounted on one end of said casing block and connected to said piston for reciprocating it, a plate on the top of said block, a hollow cover mounted on top of said plate in sealed relation thereto and forming therewith a reservoir for hydraulic fluid, said pump bore having an inlet port and a discharge port, an inlet passage in said block connecting said inlet port to said reservoir, a discharge passage in said block connecting said discharge port to said selector valves, supply and return passages in said block communicating with and controlled by said selector valves for supplying liquid under pressure and returning liquid to said reservoir, valve actuating handles connected to said shafts and extending substantially in the same direction as said pump handle and movable in planes parallel with the plane of pivotal movement of said pump handle.

2. A power pack unit comprising a casing block having bores extending inwardly from opposite sides thereof, rotary selector valves mounted in said bores and having actuating shafts substantially co-axial with said bores, a pump cylinder bore in said casing substantially perpendicular to said shafts, a piston reciprocable in said pump bore, a hollow dome-like cover mounted on top of said casing block in sealed relation thereto and forming therewith a reservoir for hydraulic fluid, said pump bore having an inlet port and a discharge port, an inlet passage in said block connecting said inlet port to said reservoir, a discharge passage in said block connecting said discharge port to said selector valves, supply and return passages in said block communicating with and controlled by said selector valves for supplying liquid under pressure and returning liquid to said reservoir, valve actuating handles connected to said shafts, and a handle for reciprocating said piston pivotally mounted on said casing block between said valve actuating handles, all of said handles extending in substantially the same direction from said casing block and being movable in substantially parallel planes.

3. A power pack unit comprising a casing block having a pair of opposite sides, at least one end substantially perpendicular to said sides and a substantially circular top portion, a hollow dome-like cover mounted on said top portion, a block containing a relief valve fixed to said top portion of said casing block, means connecting said cover to said block to retain the cover in sealed relation to said top portion to form therewith a reservoir for hydraulic fluid, said casing having bores extending inwardly from said opposite sides thereof, rotary selector valves mounted in said bores and having actuating shafts extending substantially axially of said bores, a pump cylinder bore extending into said casing block from said one end, and having an inlet port and a discharge port, an inlet passage in said block connecting said inlet port to said reservoir, a discharge passage in said block connecting said discharge port to said selector valves, supply and return passages in said block communicating with and controlled by said selector valves for supplying liquid under pressure and returning liquid to said reservoir, said relief valve being interposed between and communicating with said discharge port and said reservoir, a pump piston rceiprocable in said cylinder, valve actuating levers fixed to each of said shafts and a piston actuating handle pivotally connected to said casing block, all of said handles extending in substantially the same direction and being movable in substantially parallel planes.

References Cited in the file of this patent

UNITED STATES PATENTS

| | | |
|---|---|---|
| 1,415,617 | Wepplo | May 9, 1922 |
| 2,132,363 | Thomas et al. | Oct. 25, 1938 |
| 2,134,501 | Bennett | Oct. 25, 1938 |
| 2,187,036 | Kerber | Jan. 16, 1940 |
| 2,214,257 | Pfauser | Sept. 10, 1940 |
| 2,311,443 | Keeler | Feb. 16, 1943 |
| 2,680,347 | Kanuch | June 8, 1954 |